United States Patent
Trani

(10) Patent No.: US 10,516,856 B2
(45) Date of Patent: Dec. 24, 2019

(54) NETWORK VIDEO RECORDER CLUSTER AND METHOD OF OPERATION

(71) Applicant: Sensormatic Electronics, LLC, Boca Raton, FL (US)

(72) Inventor: James Trani, Albuquerque, NM (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 16/120,712

(22) Filed: Sep. 4, 2018

(65) Prior Publication Data

US 2018/0376110 A1 Dec. 27, 2018

Related U.S. Application Data

(63) Continuation of application No. 14/873,097, filed on Oct. 1, 2015, now Pat. No. 10,097,795.

(51) Int. Cl.
*H04N 7/18* (2006.01)
*H04N 5/77* (2006.01)
*H04N 5/232* (2006.01)

(52) U.S. Cl.
CPC ......... *H04N 7/181* (2013.01); *H04N 5/23206* (2013.01); *H04N 5/77* (2013.01)

(58) Field of Classification Search
CPC combination set(s) only.
See application file for complete search history.

(56) References Cited

U.S. PATENT DOCUMENTS

| 8,228,360 B2 * | 7/2012 | Hamilton | H04L 12/1827 348/14.01 |
| 8,830,327 B2 | 9/2014 | Tink et al. | |
| 2007/0039033 A1 * | 2/2007 | Ota | H04N 21/4147 725/115 |
| 2010/0066835 A1 * | 3/2010 | Colciago | G08B 13/19602 348/159 |
| 2011/0229105 A1 * | 9/2011 | Khan | H04N 5/765 386/200 |
| 2012/0179742 A1 * | 7/2012 | Acharya | H04N 7/18 709/202 |

* cited by examiner

Primary Examiner — Jamese Duley
(74) Attorney, Agent, or Firm — HoustonHogle LLP

(57) ABSTRACT

A video recorder cluster for use in a video surveillance system includes multiple recorder nodes that can each participate in processing of user-specified operations such as playback, recording, and analysis of the video streams. The video recorder cluster determines the required resources for processing the video data of streams, determines the available resources on each of the recorder nodes, and forwards the video data of the streams to recorder nodes that either include the required resources or include a preferred set of available resources in accordance with the required resources. The video recorder cluster presents a single cluster address for client user devices to access the resources of the video recorder cluster, thereby enabling the video recorder cluster to appear as a single virtual network video recorder to clients.

24 Claims, 6 Drawing Sheets

NETWORK VIDEO RECORDER CLUSTER AND METHOD OF OPERATION

RELATED APPLICATIONS

This application is a Continuation of U.S. patent application Ser. No. 14/873,097, filed on Oct. 1, 2015, which is incorporated herein by reference in its entirety.

BACKGROUND OF THE INVENTION

Video surveillance systems are increasingly deployed within public and private institutions, such as households, commercial buildings, businesses, retail establishments, schools, hospitals and government buildings, to list a few examples. These surveillance systems are often used for a number of different tasks, such as intelligence gathering by governments and businesses, prevention or investigation of crime by law enforcement or retail establishments, and monitoring the usage of resources or structures such as buildings, bridges or roads, to list a few examples.

A number of components are common to many of these video surveillance systems. Surveillance cameras capture frames of video data and audio data for scenes of interest and encode the video and audio data into streams. The surveillance cameras then send the streams over one or more data networks, such as governmental, service provider, enterprise or home networks for recording and analysis. The data networks typically support the Internet Protocol (IP) suite of networking protocols, in one example. Network video recorders (NVR) receive the streams from the surveillance cameras and record the streams onto data storage elements for playback and analysis. Integrated or discrete video analytics systems are often included to analyze the image data. Control systems are often used to control the surveillance system and coordinate the operation of the components. Finally, video application software running on a computer system or mobile computing device allows users to configure and manage the components and access video/images.

Operators incorporate additional network video recorders into the video surveillance systems in response to an increase in the number of supported streams. Each network video recorder supports a fixed number of streams and is addressable via a separate and unique descriptor, such as an IP address. To configure recording of the streams, operators typically use the video application software to access each network video recorder by its unique address and create an association between the stream and available recording resources within the network video recorders. Each network video recorder then records the streams by storing the video streams and metadata of the streams (e.g. affixing a time stamp to the video data) to storage elements. In examples, network video recorders can store the streams to internal storage elements or to external storage elements located elsewhere within the network. Examples of external storage elements include Network Attached Storage (NAS) and directly attached storage such as a server including multiple disk drives.

SUMMARY OF THE INVENTION

Network video recorders in current video surveillance systems have limitations. In one example, as the number of surveillance cameras generating streams increases, the operators of the video surveillance system must incorporate additional network video recorders into the system, where each of the network video recorders must be addressed and configured separately.

In addition, computing resources such as transcoders and Computer Processing Units (CPUs) or processors within the video network recorders may not be shareable among multiple network video recorders to more efficiently process operations upon video streams.

The inventive network recorder cluster can determine the resources required to process the streams, determine the available resources on each of its participating recorder nodes for processing the streams, and in response to the determined resources, forward the video data of the streams to recorder nodes that either include the required resources or include a preferred set of available resources in accordance with the required resources.

In general, according to one aspect, the invention features a video surveillance system. It comprises at least one surveillance camera that captures video data and transmits streams including the video data over a network. A video recorder cluster includes a plurality of recorder nodes, wherein the video recorder cluster receives the streams from the at least one surveillance camera, determines resources within each of the recorder nodes, and distributes operations among the recorder nodes to be performed on the streams.

In embodiments, the cluster determines required operations to execute upon the streams and in response to finding one or more recorder nodes having determined the resources matching the operations, forwards the messages from the user devices to the one or more matching recorder nodes. The matching recorder nodes will then execute the operations upon the streams.

Preferably, user devices including video management applications send messages including references to one or more streams and one or more operations to execute upon the streams.

Additionally, the video recorder cluster can further include a cluster controller for controlling the recorder nodes of the video recorder cluster. The cluster controller can be a discrete device or a software process running on one of the recorder nodes.

This cluster controller will often have an assigned cluster address, wherein user devices send the messages to the cluster address. The cluster controller will typically designate a recorder node as the source recorder for the current message transaction and forward the message to the source recorder for execution.

In general, according to another aspect, the invention features a method. It comprises capturing video data and transmitting streams including the video data over a network, receiving the streams from the at least one surveillance camera at a video recorder cluster, determining resources among recorder nodes of the video recorder cluster, and distributing operations among the recorder nodes to be performed on the streams.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
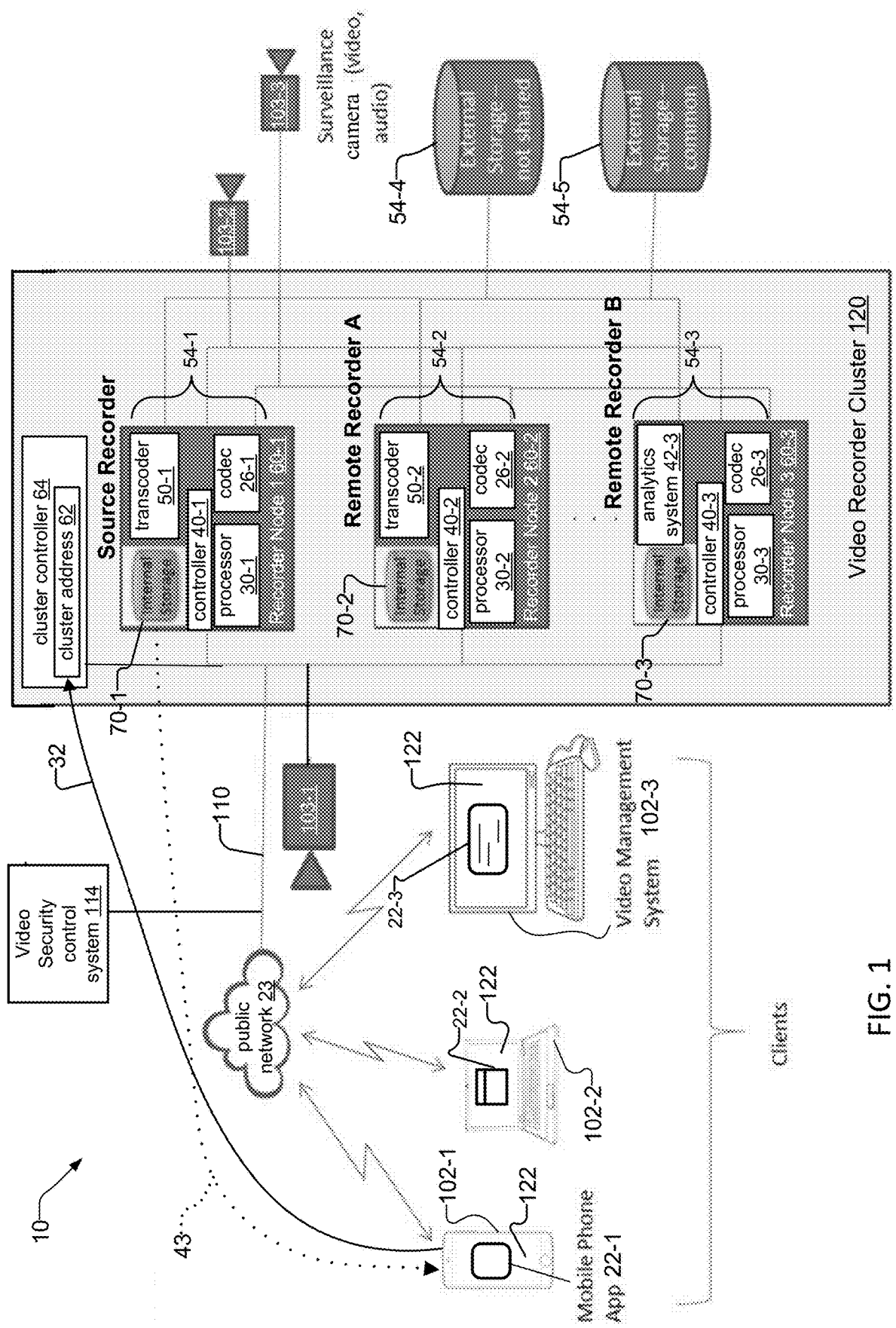
FIG. 1 is a system block diagram of a video surveillance system that includes a first embodiment of a video recorder cluster, where the video recorder cluster includes multiple recorder nodes, and where each of the recorder nodes include resources for executing operations upon the streams including playback, recording, and analysis operations.

FIG. 1 shows a first exemplary video surveillance system 10 that enables one or more client user devices 102 to request streams of video data and request operations to execute upon the streams from a video recorder cluster 120. The video surveillance system 10 includes surveillance cameras 103-1 through 103-3, a video recorder cluster 120, one or more client user devices 102, and a video security control system 114. The video security control system 114 coordinates control of the components of the system 10.

The surveillance cameras 103 capture video data and/or audio data of a scene and transmit streams including the video data and/or audio data over a network 110. The network 110 is typically a Local Area Network (LAN), enterprise network and/or service provider network that supports communication protocols such as Internet Protocol (IP) or proprietary communications protocols, in examples.

The client user devices 102, for example, include a mobile phone or mobile computing device 102-1, a laptop 102-2, and a video management system 102-3, which is preferably desktop-based computing system. Each of the user devices 102 includes a video management application 22 for managing the components of the video surveillance system 10 and a display 122.

Each of the video management applications 22 typically include different levels of configuration and management support of the video surveillance system 10 based on the available computing resources of the user device 102 upon which the video management applications 22 are executing. The video management applications 22 include a mobile phone app 22-1 running on the mobile phone or mobile computing device 102-1, a web browser 22-2 running on laptop 102-2, and an enterprise application 22-3 running on the video management system 102-3. The user devices 102 access and communicate with the video recorder cluster 120 via a cellular (broadband) network and/or public network 23, such as the internet.

For example, because the desktop-based video management system 102-3 includes significant memory and processor resources and provides a large display 122, the enterprise application 22-3 typically provides the ability to manage all components in the video surveillance system 10 and can typically display multiple simultaneous video streams on its display 122. The web browser 22-2 might provide similar functionality as that of the enterprise application 22-3 but supports the display of fewer streams on its display 122. Finally, the mobile phone app 22-1 often only provides a subset of the capabilities of that provided by video management applications 22-2 and 22-3.

The video recorder cluster 120 includes recorder nodes 60-1 through 60-3, and a cluster controller 64. The cluster controller 64 has an assigned cluster address 62. Each recorder node 60 is a fully functional, standalone network video recorder that has been enhanced with software and/or hardware to function as a recorder node 60 within the video recorder cluster 120. In examples, the recorder nodes 60 can process video streams in series or parallel configurations.

In another embodiment, each of the recorder nodes 60 includes a notional cluster controller 64 as a software process, where each of the notional cluster controllers 64 include the same value for their cluster address 64. One of the recorder nodes 60 presents itself as the "master" recorder node 60 and services the messages 32 from the client user devices addressed to the cluster address 64, and the remaining recorder nodes 60 function as backup recorder nodes 60.

Each of the recorder nodes 60 include resources 54, such as computing and storage resources. Recorder node 60-1 has resources 54-1 including a transcoder 50-1, a controller 40-1, a central processing unit (CPU) or processor 30-1, a codec 26-1, and internal storage 70-1. The internal storage 70-1 is a series of disk drives, in one example. Recorder node 60-2 has resources 54-2 including a transcoder 50-2, a controller 40-2, a processor 30-2, a codec 26-2, and internal storage 70-2. Recorder node 60-3 has resources 54-3 including an analytics system 42-3, a controller 40-3, a processor 30-3, a codec 26-3, and internal storage 70-3.

The recorder nodes 60 also typically have access to external storage resources 54-4 that are specific to a given recorder node 60 and to external storage resources 54-5 that are common to (e.g. shared) among the recorder nodes 60. One or more of the recorder nodes 60 are also configured as backup recorders as part of a fail-over/redundancy scheme. In the event of a failure of one recorder node 60, one of the other recorder nodes 60 can service the messages requested by the client user devices 102.

The recorder nodes 60 function as a single, virtual network recorder. Each recorder node 60 has access to the resources 54 of the other recorder nodes 60. Via the controller 40 within each recorder node 60, the recorder nodes 60 can send messages to other recorder nodes, also known as internal messages. These messages include resource request messages to determine the available resources on each of the recorder nodes 60, and messages requesting use of a specific resource on another recorder node 60. Also via their controllers 40, the recorder nodes 60 can also establish internal video streams between the recorder nodes 60.

Operators of the system 10, via the video management applications 22, send messages 32 to the video recorder cluster 120 to request streams and operations upon the streams. The messages 32 specify the cluster address 62 of the cluster controller 64 of the video recorder cluster 120. The cluster controller 64 then determines which of the recorder nodes 60 include the requested video stream, also known as the source recorder [node], and forwards the request message to the source recorder via its controller 40.

In this way, operators do not require a priori knowledge of which network video recorders include the video streams the operators are seeking. This simplifies addressing of the messages 32 sent to the video recorder cluster 120. Moreover, because the client user devices 102 specify only the cluster address 62 for all interactions with the video recorder cluster 120 and its recorder nodes 60, the video recorder cluster 120 appears as a single virtual network video recorder to the client user devices 102.

The messages 32 not only include references to one or more video streams, but also include one or more operations for the video recorder cluster 120 to execute upon the streams. In examples, the operations include playback, recording, and analysis (e.g. analyze the video data of the stream on an analytics system 42). In one example, in response to a playback request message 32 for a video stream, recorder node 1 60-1 sends a response stream 43 to the mobile phone app 22-1 video management application.

Figure 2:
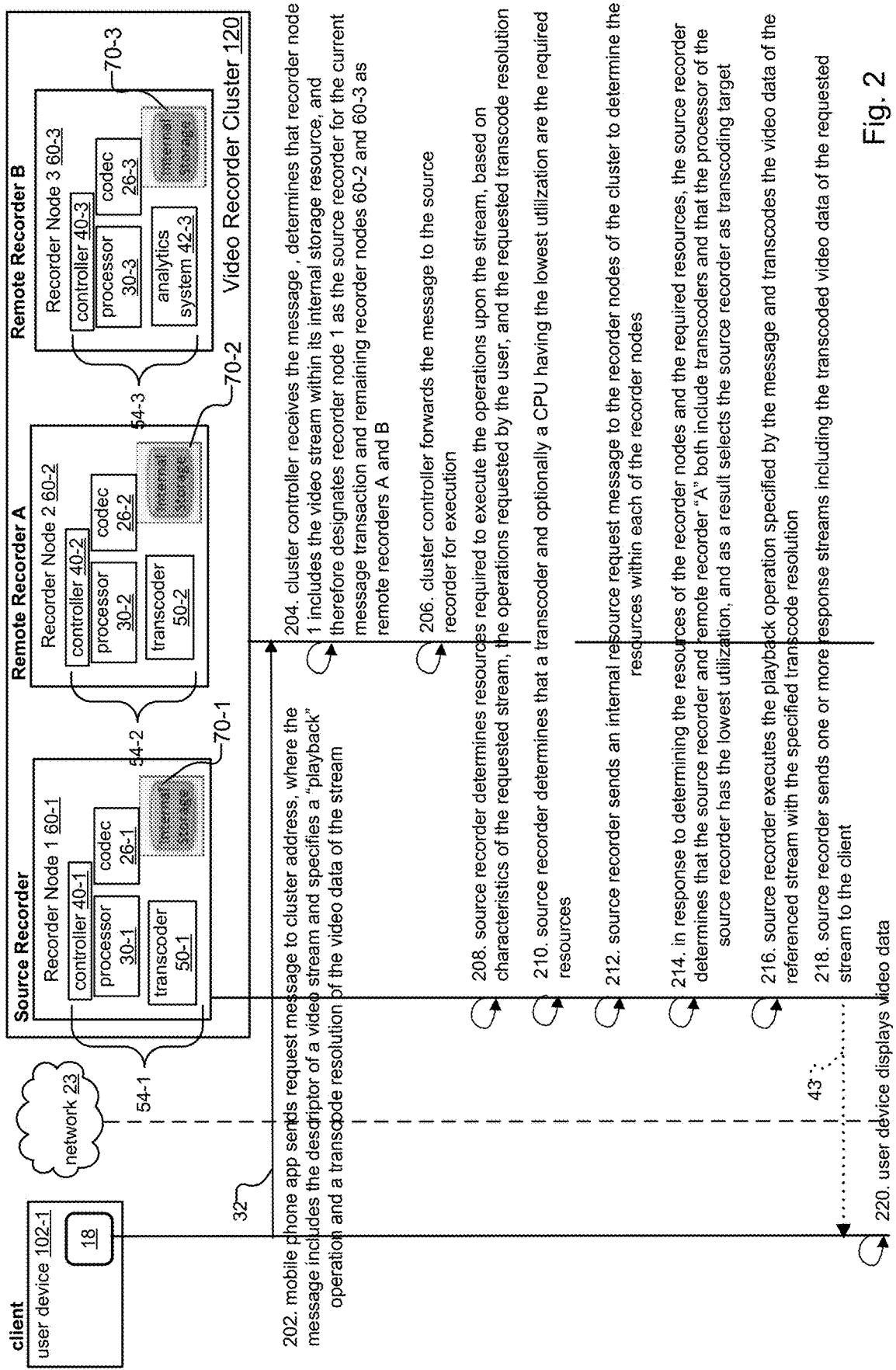
FIG. 2 is a sequence diagram that describes a method of operation of the video recorder cluster of FIG. 1, where the method describes how the video recorder cluster processes a message from a client user device requesting playback of a previously recorded video stream with a specified transcoding resolution, and where transcoding and transmission of the video data to the client is executed by the same recorder node of the video recorder cluster that includes the requested stream.

FIG. 2 shows a method which describes how the video recorder cluster 120 of FIG. 1 processes an exemplary message 32 requesting that the video recorder cluster 120 "playback" a previously recorded video stream. An operator creates a message 32 on the mobile phone app video management application 22-1 to request playback of a specific video stream.

In step 202, mobile phone app 18 of mobile phone user device 102-1 sends request message 32 to the cluster address 62 of the video recorder cluster 120, where the message includes the descriptor of a video stream and specifies a "playback" operation and a transcode resolution of the video data of the stream.

In step 204, the cluster controller 64 of the video recorder cluster 120 receives the message 32, determines that recorder node 1 with reference 60-1 includes the video stream within its internal storage 70-1 resource, and therefore designates recorder node 1 60-1 as the source recorder for the current message transaction. The remaining recorder nodes 60-2 and 60-3 are designated as remote recorder nodes A and B, respectively. According to step 206, the cluster controller 64 then forwards the message 32 to the source recorder, recorder node 60-1, for execution.

In one example, the cluster controller 64 locates the requested video stream among the storage resources 54 associated with the video recorder cluster 120 and its recorder nodes 60 according to a preferred order. The stream lookup is executed in the following order until the stream is located or an error is encountered: internal storage of source recorder, internal storage of any remote recorders, any external storage of the source recorder that is not shared 54-4 with any other recorder nodes, and any common external storage 54-5.

The source recorder 60-1 then determines the resources required to execute the operation upon the requested stream, and determines the available resources 54 within all recorder nodes 60 that could satisfy the required resources. This is described in more detail in the description that accompanies the remaining steps of FIG. 2, included herein below.

According to step 208, the source recorder determines the resources required to execute the operations upon the stream, based on characteristics of the requested stream, the operations requested by the user, and the requested transcode resolution. In step 210, the source recorder 60-1 or cluster controller 64 determines that a transcoder 50 and optionally a CPU having the lowest utilization are the required resources to process the video stream.

Then, in step 212, the source recorder 60-1 or cluster controller 64 sends an internal resource request message to the recorder nodes 60-1 through 60-3 of the video recorder cluster 120 to determine the resources 54 within each of the recorder nodes 60.

According to step 214, in response to determining the resources 54 of the recorder nodes 60 and the required resources, the source recorder 60-1 or cluster controller 64 determines that the source recorder 60-1 and remote recorder "A" both include transcoders 50 and that processor 50-1 of the source recorder 60-1 has the lowest utilization, and as a result selects the source recorder 60-1 as the transcoding target. In step 216, the source recorder 60-1 executes the playback operation specified by the message and transcodes the video data of the referenced stream with the specified transcode resolution.

In step 218, the source recorder 60-1 sends one or more response streams 43 including the transcoded video data of the requested stream to the client, which is the mobile user device 102-1. Finally, according to step 220, the mobile user device 102-1 displays the video data of the requested stream on the display 122 of the mobile user device 102-1.

Figure 3:
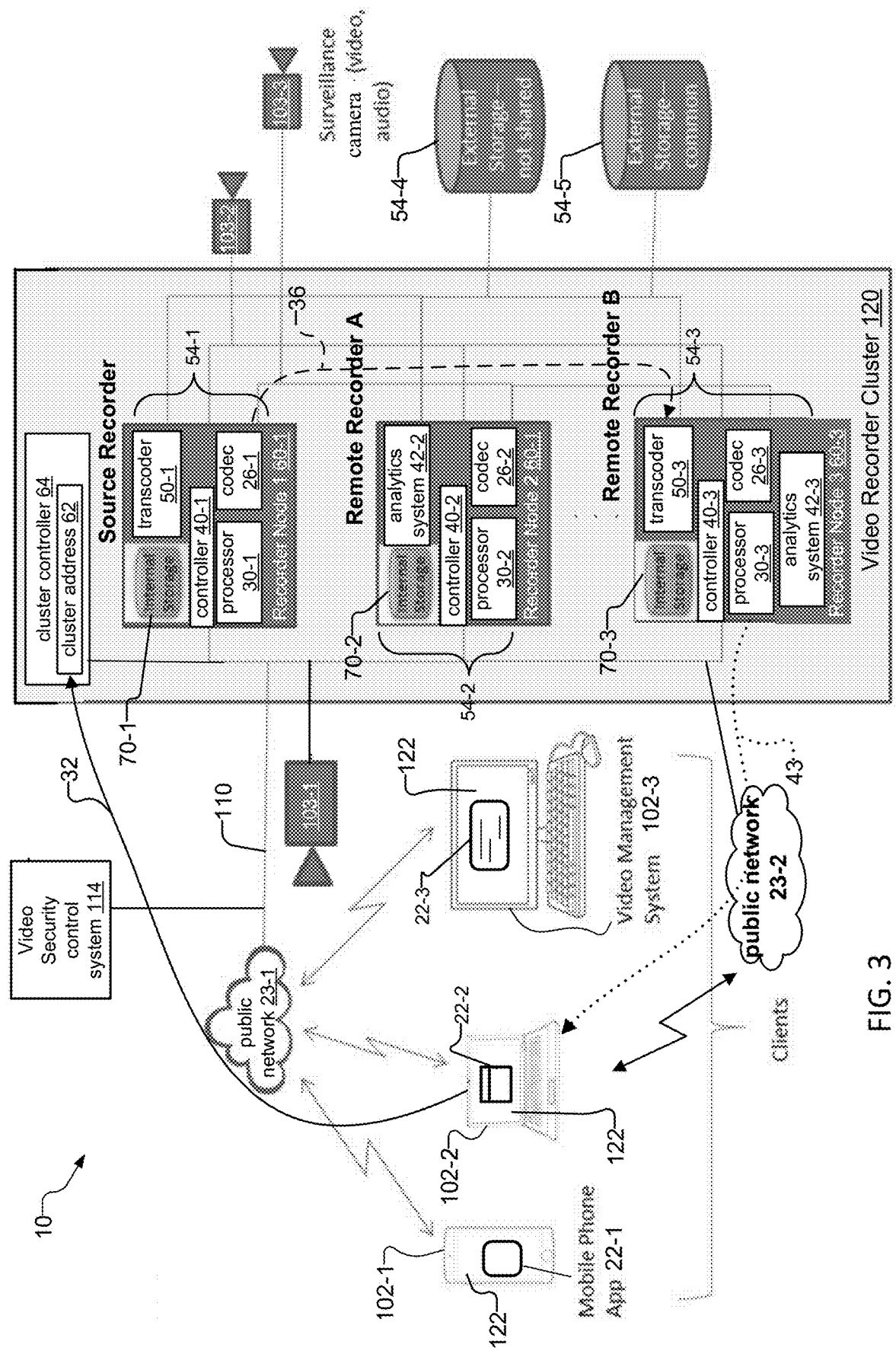
FIG. 3 is a system block diagram of a video surveillance system that includes a second embodiment of a video recorder cluster, where the recorder nodes include different resources than the recorder nodes of FIG. 1.

FIG. 3 shows a second exemplary video surveillance system 10 that includes different resources 54 within the recorder nodes 60 of the video recorder cluster 120 than that presented in FIG. 1. The different distribution of the resources 60 provides the ability to describe how the video recorder cluster 120 can distribute video processing operations across different recorder nodes 60 in response to determining the available resources on each of the recorder nodes 60. As in FIG. 1, the user devices 102 access and communicate with the video recorder cluster 120 via one or more public networks 23-1 and 23-2.

As in FIG. 1, the video recorder cluster 120 includes three recorder nodes 60-1 through 60-3, where recorder node 1 60-1 is the source recorder and recorder node 2 60-2 and recorder node 3 60-3 are designated as remote recorders A and B, respectively.

Unlike FIG. 1, however, the recorder nodes 60 of FIG. 3 include different resources 54. Recorder node 60-1 includes resources 54-1, which include controller 40-1, processor 30-1, codec 26-1, transcoder 50-1, and internal storage 70-1. Recorder node 60-2 includes resources 54-2, which include controller 40-2, processor 30-2, codec 26-2, analytics system 42-2, and internal storage 70-2. Recorder node 60-3 includes resources 54-3, which include controller 40-3, processor 30-3, codec 26-3, analytics system 42-3, transcoder 50-3, and internal storage 70-3.

Also unlike FIG. 1, where the transcoder 50-1 of the source recorder transcodes the video data of the requested stream and transmitted the stream to the client, remote recorder B in FIG. 3 transcodes the video data of the requested stream and transmits the stream to the client. In response to determining the resources 54 on each of the recorder nodes 60, the source recorder or cluster controller 64 determines that remoter recorder B has the preferred required resources to transcode the stream, and establishes an internal stream 36 to remote recorder B. The source recorder forwards the video data of the requested stream over the internal stream to remote recorder B, and forwards the original message from the client user device 102-2 to remote recorder B. This distribution of processing tasks among the recorder nodes 60 is described in more detail via the description that accompanies the methods of FIG. 4 and FIG. 5, included herein below.

Figure 4:
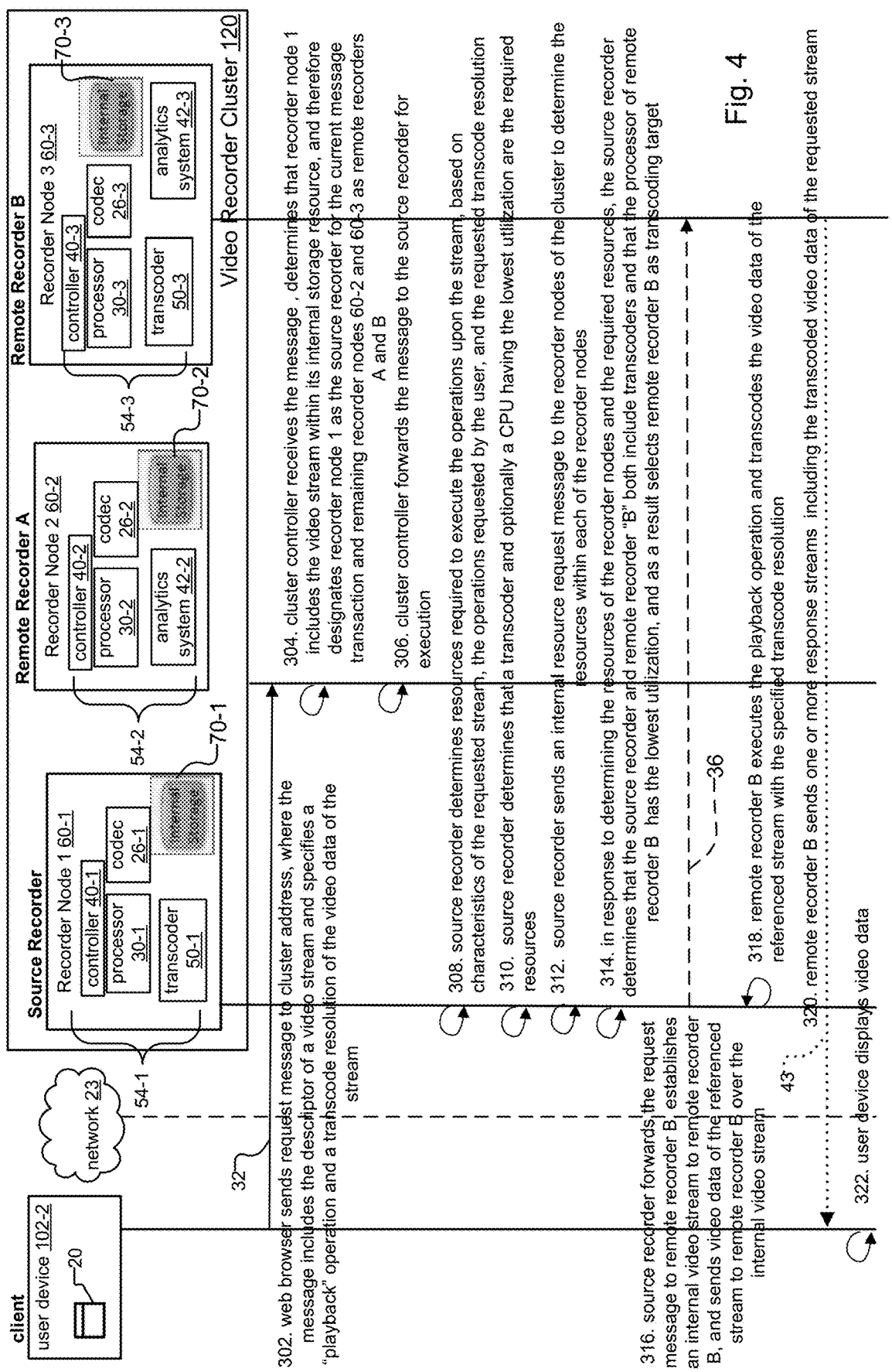
FIG. 4 is a sequence diagram that describes a method of operation of the video recorder cluster of FIG. 3, where the method describes how the video recorder cluster processes a message from a client user device requesting playback of a previously recorded video stream with a specified transcoding resolution, and where transcoding and transmission of the video data to the client is executed by a different recorder node of the video recorder cluster than the recorder node that includes the requested stream.

FIG. 4 shows a method which describes how the video recorder cluster 120 of FIG. 3 processes an exemplary message 32 requesting that the video recorder cluster 120 "playback" a previously recorded video stream. An operator creates a message 32 on web browser video management application 22-2 of laptop user device 102-2 to request playback of a specific video stream.

In step 302, web browser 20 of laptop user device 102-2 sends request message to cluster address of the video recorder cluster 120, where the message includes the descriptor of a video stream and specifies a "playback" operation and a transcode resolution of the video data of the stream.

In step 304, the cluster controller 64 receives the message 32, determines that recorder node 1 60-1 includes the video stream within its internal storage resource 70-1, and therefore designates recorder node 1 as the source recorder for the current message transaction and remaining recorder nodes 60-2 and 60-3 as remote recorders A and B. In step 306, the cluster controller 64 forwards the message to the source recorder for execution.

According to step 308, the source recorder 60 determines the resources required to execute the operations upon the stream, based on characteristics of the requested stream, the operations requested by the user, and the requested transcode resolution. In step 310, the source recorder 60-1 or cluster controller 64 determines that a transcoder 50 and optionally a CPU having the lowest utilization are the required resources to process the video stream.

Then, in step 312, the source recorder 60-1 sends an internal resource request message to the recorder nodes 60-1 through 60-3 of the video recorder cluster 120 to determine the resources 54 within each of the recorder nodes 60.

According to step 314, in response to determining the resources 54 of the recorder nodes 60 and the required resources, the source recorder 60-1 determines that the source recorder 60-1 and remote recorder "B" 60-3 both include transcoders 50 and that the processor 30-3 of remote recorder B 60-3 has the lowest utilization, and as a result selects remote recorder B 60-3 as the transcoding target.

In step 316, the source recorder forwards the request message to remote recorder B, establishes an internal video stream 36 to remote recorder B, and sends video data of the referenced stream to remote recorder B over the internal video stream 36.

In step 318, remote recorder B 60-3 executes the playback operation and transcodes the video data of the referenced stream with the specified transcode resolution. In step 320, remote recorder B 60-3 sends one or more response streams 43 including the transcoded video data of the requested stream to the client user device 102-2, the laptop user device.

The laptop user device 102-2 displays the video data of the requested stream within its web browser 20 in step 322.

Figure 5:
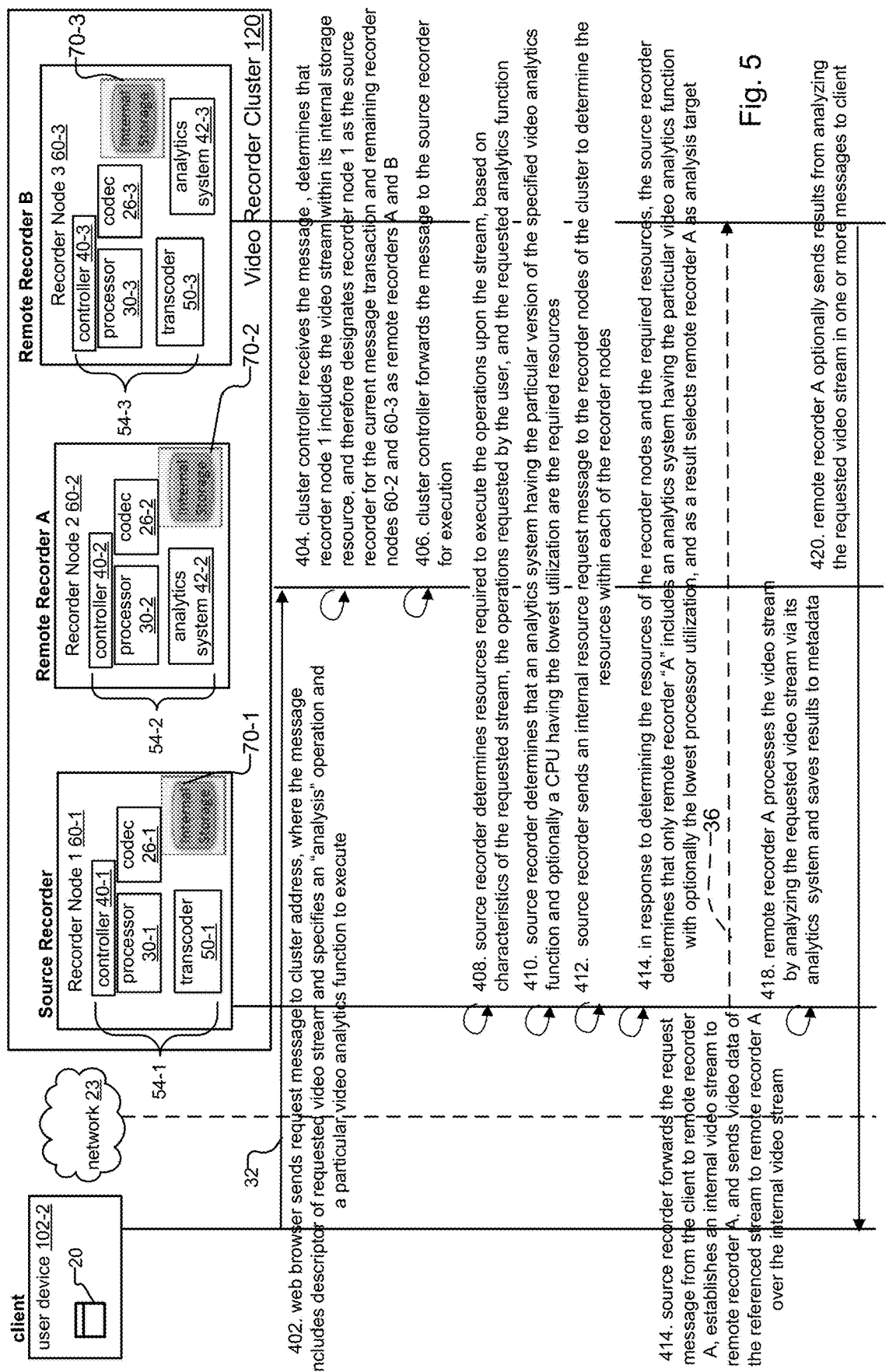
FIG. 5 is a sequence diagram that describes another method of operation of the video recorder cluster of FIG. 3, where the method describes how the video recorder cluster processes a message from a client user device requesting execution of a specific video analytics function upon a previously recorded video stream.

FIG. 5 shows a method which describes how the video recorder cluster 120 of FIG. 3 processes an exemplary message 32 requesting that the video recorder cluster 120 analyze a previously recorded video stream. An operator creates a message 32 on web browser video management application 22-2 of laptop user device 102-2 to request analysis of the specific video stream.

In step 402, web browser 20 of laptop user device 102-2 sends request message to cluster address of the video recorder cluster 120, where the message includes the descriptor of a video stream and specifies an "analysis" operation and a particular video analytics function to execute.

In step 404, the cluster controller 64 receives the message 32, determines that recorder node 1 60-1 includes the video stream within its internal storage resource 70-1, and therefore designates recorder node 1 as the source recorder for the current message transaction and remaining recorder nodes 60-2 and 60-3 as remote recorders A and B. In step 406, the cluster controller 64 forwards the message to the source recorder for execution.

According to step 408, the source recorder 60-1 determines the resources required to execute the operations upon the stream, based on characteristics of the requested stream, the operations requested by the user, and the requested video analytics function. In step 410, the source recorder 60-1 determines that an analytics system 42 having the specified video analytics function and optionally a CPU having the lowest utilization are the required resources.

Then, in step 412, the source recorder 60-1 sends an internal resource request message to the recorder nodes 60-1 through 60-3 of the video recorder cluster 120 to determine the resources 54 within each of the recorder nodes 60.

According to step 414, in response to determining the resources 54 of the recorder nodes 60 and the required resources, the source recorder 60-1 determines that only remote recorder "A" includes an analytics system 42-2 having the particular video analytics function with optionally the lowest processor utilization, and as a result selects remote recorder A as the analysis target.

In step 416, the source recorder forwards the request message to remote recorder A, establishes an internal video stream 36 to remote recorder A, and sends video data of the referenced stream to remote recorder A over the internal video stream 36.

In step 418, remote recorder A 60-2 processes the video stream by analyzing the requested video stream via its analytics system 42-2 and saves results to metadata. Finally, in step 420, remote recorder A 60-2 optionally sends results from analyzing the requested video stream in one or more messages to client user device 102-2.

Figure 6:
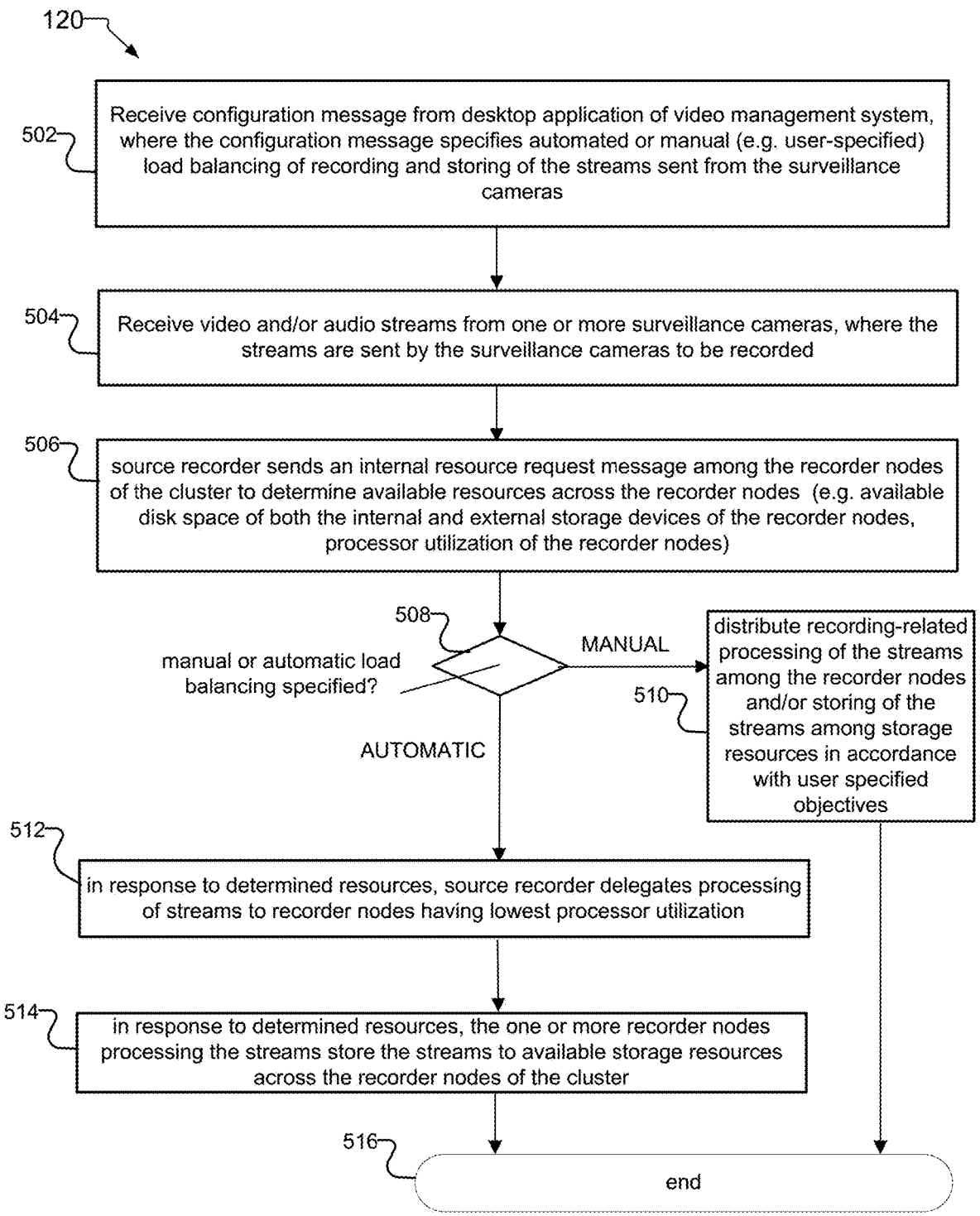
FIG. 6 shows a method of the cluster for balancing the processing and recording of streams sent from one or more surveillance cameras, where the method describes both automatic and user specified load balancing of the streams.

FIG. 6 shows a load balancing method of the video recorder cluster 120 for balancing the processing and recording of streams sent from one or more surveillance cameras 103, where the method describes both automatic and user specified (e.g manual) load balancing of the streams.

In step 502, the video recorder cluster 120 receives a configuration message from desktop application 22-3 of video management system 102-3, where the configuration message specifies automated or manual (e.g. user-specified) load balancing of recording and storing of the streams sent from the surveillance cameras 103.

In step 504, the video recorder cluster 120 receives video and/or audio streams from one or more surveillance cameras 103, where the streams are sent by the surveillance cameras 103 to be recorded.

In step 506, the source recorder sends an internal resource request message among the recorder nodes 60 to determine availability of resources across the recorder nodes 60 cluster (e.g. available disk space of both the internal and external storage devices of the recorder nodes, processor utilization of the recorder nodes 60).

In step 508, the video recorder cluster 120 tests of manual or automatic load balancing was specified by the user. If a manual balancing request was specified, the method transitions to step 510, else automatic balancing is executed and the method transitions to step 512.

In step 510, the video recorder cluster 120 distributes recording-related processing of the streams among the recorder nodes 60 and/or storing of the streams among storage resources in accordance with user specified objectives. The method then transitions to step 516 to end processing associated with the manual balancing associated with recording (e.g. storing) the streams.

In step 512, in response to the determined resources, the source recorder delegates processing of streams to recorder nodes 60 having lowest processor utilization. Then, in step 514, in response to determined resources, the one or more recorder nodes 60 processing the streams store the streams to available storage resources across the recorder nodes 60 of the cluster. The method then transitions to step 516 to end processing associated with the automatic balancing associated with recording (e.g. storing) the streams.

While this invention has been particularly shown and described with references to preferred embodiments thereof, it will be understood by those skilled in the art that various changes in form and details may be made therein without departing from the scope of the invention encompassed by the appended claims.

What is claimed is:

1. A video surveillance system, comprising:
    at least one surveillance camera that captures video data and transmits streams including the video data over a network;
    a user device sending a request message, where the request message includes a descriptor of a video stream and specifies an operation to be performed on the video stream; and
    a video recorder cluster receiving the streams and the request message, the video recorder cluster including: recorder nodes;
        a cluster controller designating one recorder node as a source recorder node for the request message and remaining recorder nodes as remote recorder nodes;
        wherein the source recorder node determines resources required to execute the operations upon the video stream based on characteristics of the video stream and forwards the request message to one of the remote recorder nodes that executes the operations on the video data stream.

2. The video surveillance system as claimed in claim 1, wherein the recorder nodes execute the operations upon the streams.

3. The video surveillance system as claimed in claim 1, wherein the user device includes a video management application that sends the messages including references to one or more streams and one or more operations to execute upon the streams.

4. The video surveillance system as claimed in claim 1, wherein the cluster controller is a software process running on one of the recorder nodes.

5. The video surveillance system as claimed in claim 1, wherein the cluster controller has an assigned cluster address, and wherein user devices send the messages to the cluster address.

6. The video surveillance system as claimed in claim 5, wherein the cluster controller forwards the message to the source recorder for execution.

7. The video surveillance system as claimed in claim 1, wherein the video recorder cluster distributes playback and recording operations among the recorder nodes to be performed on the streams.

8. The video surveillance system as claimed in claim 1, wherein the video recorder cluster distributes analysis, transcode, and playback and recording operations among the recorder nodes to be performed on the streams in which the video data of the stream is analyzed on an analytics system.

9. A method, comprising:
    capturing video data and transmitting streams including the video data over a network;
    receiving the streams from the at least one surveillance camera at a video recorder cluster,
    determining resources among recorder nodes of the video recorder cluster, and
    distributing operations among the recorder nodes to be performed on the streams.

10. The method as claimed in claim 9, further comprising:
    determining required operations to execute upon the streams;
    finding one or more recorder nodes having determined the resources matching the operations; and
    forwarding the messages from the user devices to the one or more matching recorder nodes.

11. The method as claimed in claim 10, wherein the matching recorder nodes execute the operations upon the streams.

12. The method as claimed in claim 9, further comprising user devices including video management applications sending messages including references to one or more streams and one or more operations to execute upon the streams.

13. The method as claimed in claim 9, further comprising a cluster controller controlling the recorder nodes of the video recorder cluster.

14. The method as claimed in claim 13, wherein the cluster controller is a software process running on one of the recorder nodes.

15. The method as claimed in claim 13, further comprising the cluster controller having an assigned cluster address, and wherein user devices send the messages to the cluster address.

16. The method as claimed in claim 15, further comprising the cluster controller designating a recorder node as the source recorder for the current message transaction and forwarding the message to the source recorder for execution.

17. The method as claimed in claim 9, wherein distributing operations among the recorder nodes to be performed on the streams comprises:
    user devices sending messages that include references to the streams and the operations to perform on the streams;
    determining source recorder nodes that include the streams and identifying other recorder nodes as remote recorder nodes; and in response to determining that the remote recorder nodes include required resources for performing the operations on the streams:
   forwarding the messages to the remote recorder nodes;
   establishing internal streams within the video recorder cluster, between the source recorder nodes and the remote recorder nodes; and
   sending video data of the streams over the internal streams to the remote recorder nodes.

18. The method as claimed in claim 9, wherein the video recorder cluster distributes playback and recording operations among the recorder nodes to be performed on the streams.

19. The method as claimed in claim 9, wherein the video recorder cluster distributes analysis operations among the recorder nodes to be performed on the streams in which the video data of the stream is analyzed on an analytics system.

20. The method as claimed in claim 9, wherein the video recorder cluster distributes transcode operations among the recorder nodes to be performed on the streams in which the streams are transcoded to a specified transcode resolution.

21. A method of a video surveillance system, comprising:
   capturing video data and transmitting streams including the video data over a network with at least one surveillance camera;
   sending a request message, where the request message includes a descriptor of a video stream and specifies an operation to be performed on the video stream with a user device;
   receiving the streams and the request message at a video recorder cluster that includes recorder nodes and a cluster controller designating one recorder node as a source recorder node for the request message and remaining recorder nodes as remote recorder nodes;
   determining resources required to execute the operations upon the video stream based on characteristics of the video stream with the source recorder node; and
   forwarding the request message to one of the remote recorder nodes that executes the operations on the video data stream.

22. The method as claimed in claim 21, wherein the recorder nodes execute the operations upon the streams.

23. The method as claimed in claim 21, wherein the user device includes a video management application that sends the messages including references to one or more streams and one or more operations to execute upon the streams.

24. The method as claimed in claim 21, wherein the cluster controller is a software process running on one of the recorder nodes.

* * * * *